United States Patent
Florian

(10) Patent No.: US 11,318,365 B2
(45) Date of Patent: May 3, 2022

(54) MAT SYSTEM, ESPECIALLY FOR SPORTS PURPOSES

(71) Applicant: Trocellen GmbH, Troisdorf (DE)

(72) Inventor: Paolo Florian, Carbonera (IT)

( * ) Notice: Subject to any disclaimer, the term of this patent is extended or adjusted under 35 U.S.C. 154(b) by 68 days.

(21) Appl. No.: 16/644,122

(22) PCT Filed: Sep. 4, 2018

(86) PCT No.: PCT/EP2018/073654
§ 371 (c)(1),
(2) Date: Mar. 3, 2020

(87) PCT Pub. No.: WO2019/043236
PCT Pub. Date: Mar. 7, 2019

(65) Prior Publication Data
US 2020/0269126 A1   Aug. 27, 2020

(30) Foreign Application Priority Data

Sep. 4, 2017 (EP) ..................................... 17189283

(51) Int. Cl.
*B32B 5/18* (2006.01)
*A63C 19/04* (2006.01)
(Continued)

(52) U.S. Cl.
CPC ................ *A63C 19/04* (2013.01); *A63B 6/00* (2013.01); *A63B 21/4037* (2015.10); *B32B 5/18* (2013.01);
(Continued)

(58) Field of Classification Search
None
See application file for complete search history.

(56) References Cited

U.S. PATENT DOCUMENTS

2013/0017372 A1* 1/2013 Mechling ................. B32B 5/18
428/192

FOREIGN PATENT DOCUMENTS

DE   20107338 U1   8/2001
EP   2033547 A1   3/2009
(Continued)

OTHER PUBLICATIONS

Korean Intellectual Property Office, Office Action Issued in Application No. 10-2020-7006741, dated Mar. 26, 2021, Republic of Korea, 12 pages.
(Continued)

*Primary Examiner* — Alexander S Thomas
(74) *Attorney, Agent, or Firm* — Alleman Hall Creasman & Tuttle LLP

(57) ABSTRACT

The invention concerns a mat system comprising a plurality of individual mats, each with a top side, a bottom side, and at least one rectilinear side edge. The rectilinear side edges each have at least one undercut recess, corresponding to connecting means which enable, by engagement of each one of their halves in an undercut recess, a connecting of two mats along their rectilinear side edges. The individual mats and the connecting means each comprise at least one layer of foam material. In order to equal out even large tolerances in the orienting of the individual mats to each other, the connecting means each comprise two interconnected circular segment regions with a radius R, R', wherein for the spacing A of the centre points of the circular segment regions the following relation applies: (I) 0.8*(R+R')<A<1.3*(R+R').

14 Claims, 6 Drawing Sheets

(51) Int. Cl.
*A63B 6/00* (2006.01)
*A63B 21/00* (2006.01)

(52) U.S. Cl.
CPC ..... *B32B 2266/025* (2013.01); *B32B 2471/04* (2013.01)

(56) References Cited

FOREIGN PATENT DOCUMENTS

| | | |
|---|---|---|
| EP | 2243895 A2 | 10/2010 |
| EP | 2957328 A1 | 12/2015 |
| EP | 2957328 B1 | 7/2017 |
| FR | 2182378 A5 | 12/1973 |
| JP | 2004033502 A | 2/2004 |
| JP | 3122674 U | 6/2006 |
| KR | 20090053047 A | 5/2009 |
| KR | 20160003169 U | 9/2016 |

OTHER PUBLICATIONS

ISA European Patent Office, International Search Report Issued in Application No. PCT/EP2018/073654, dated Nov. 23, 2018, WIPO, 3 pages.

Japan Patent Office, Office Action Issued in Application No. 2020533361, dated Mar. 10, 2021, 27 pages.

* cited by examiner

MAT SYSTEM, ESPECIALLY FOR SPORTS PURPOSES

TECHNICAL FIELD

The invention concerns a mat system suitable for sports purposes, comprising a plurality of individual mats, each with a top side, a bottom side running parallel with it, and at least one rectilinear side edge, wherein the individual mats can be joined together by connecting means.

BACKGROUND ART

From EP 2243895 A2 there is known a mat system with connecting means, in which the connecting means consist of two roughly T-shaped segments, joined to each other by a joining bridge, which engage in corresponding undercut recesses in the rectilinear edges of the individual mats.

A similar system is also known from EP 2033547 A1.

From EP 2957328 B1 there is known a sports mat system from the applicant, with which mat arrangements can be constructed having several colours.

What is common to the known mat systems is that when constructing a mat system and joining the individual mats by the connecting means a very precise orienting of the mats to each other must be done. In many applications, such as school sports and martial arts, it is necessary however to equal out certain tolerances in the orienting of the individual mats to each other and those in the arrangement of the undercuts in the individual mats which correspond to each other.

Problem to be Solved

Therefore the problem which the present invention proposes to solve is to provide a mat system of this kind, which is especially suitable for sports purposes and which can equal out even large tolerances in the orienting of the individual mats with respect to each other and in the arrangement of the undercut recesses of the individual mats.

DISCLOSURE OF INVENTION

The present invention solves this problem.

One key aspect of the present invention is the configuration of the connecting means each having two circular segment regions in particular joined together by a short joining bridge. A joining bridge is understood here to mean the region which joins the two circular segments together. If the spacing of the centre points of the circular segments is less than the sum of their radii, this is the overlapping region of the two circular segments. In this way, it is preferably accomplished that each of the two segments engages in rotatable manner within the correspondingly shaped recesses of the individual mats, so that when two mats lying next to one another at the edges are displaced, the respective circular segment regions of the connecting means can rotate within the likewise circular segment undercut recesses and thus equal out considerable tolerances.

However, the prerequisite for this is that a joining bridge which joins together the interconnected circular segments of the connecting means is relatively small in relation to the radius of the circular segment regions.

It has been found that a satisfactory function is only obtained if the spacing A between the two centre points of the circular segment regions is larger than 0.8 times the sum of the radii (R+R') and less than 1.3 times the sum of the radii (R+R'):

$$0.8*(R+R') < A < 1.3*(R+R'). \quad (I)$$

Preferably, for the spacing A of the centre points (M, M') of the circular segment regions in relation to the radii the following relation applies:

$$0.9*(R+R') < A < 1.15*(R+R'). \quad (II)$$

Basically, the connecting means may be asymmetrical in construction with different radii of the circular segment regions. But preferably the two circular segment regions R and R' are identical and the connecting means are symmetrical with respect to an axis of symmetry running through the middle of the connecting region connecting the circular segment regions, i.e. running through the middle of the connecting line of the centre points of the two circular segment regions. Preferably, the radii R and R' are 25 to 50 mm.

In principle, it is possible for the individual connecting means to have, in addition to the two primary circular segment regions that are located next to one another at the spacing—as defined above—or slightly overlap and are connected together by a short joining bridge, further segments, in particular on the two sides, located opposite the joining bridge between the two circular segment regions, of the connecting means. These additional, secondary segments can be further circular segments, in particular with a larger radius than the primary circular segment regions. Although the secondary segments impede the actually desired rotatability of the two primary circular segment regions somewhat, they result in higher overall loadability of the connection of the mats. The impeded rotatability of the two primary circular segment regions can be compensated, in this embodiment of the invention, if appropriate by greater flexibility of the material used for the connecting means, such that the two primary circular segment regions each undergo a degree of torsion.

In the above-described embodiment of the invention with two primary circular segment regions joined together by a short joining bridge and additional, secondary circular segment regions, the radii of the primary circular segment regions R and R' are preferably 10 to 30 mm and the secondary circular segment regions preferably 25 to 70 mm.

The shape of the individual mats is of lesser importance for the invention, as long as at least one of their edges is rectilinear. It is advantageous, however, if all edges of all mats are rectilinear. Preferably, however, the individual mats have a rectangular shape in the top view and also a rectangular shape in cross section.

Each individual mat preferably comprises a plurality of undercut recesses, each having a circular segment region having roughly the same radius as the two circular segment regions of the connecting means. In order to achieve a lower or higher friction torque when rotating the circular segment regions of the connecting means in the corresponding undercut recesses of the mats, it is however possible to design the undercut recesses such that their radius is slightly bigger or smaller than the radius of the circular segment regions of the connecting means. Preferably, the difference between the radius of the undercut recesses and the radius of the circular segment regions of the connecting means is less than 6% and more preferably less than 3%.

The dimensions of the individual mats are likewise basically chosen at will within broad ranges for the invention, but preferably the edge lengths of the mats are 0.5 to 4 m.

The spacings of the individual undercut recesses of the individual mats on each of their edges are preferably 100 to 1000 mm.

It is essential to the invention that the individual mats and preferably also the individual connecting means have certain elasticity. This condition is basically fulfilled if the individual mats and connecting means consist mainly of foam material with a certain elasticity, as is specified. According to one especially preferred embodiment of the invention, both the mats and the connecting means consist at least partly of a foam material with a density between 30 and 150 kg/m$^3$, especially preferably cross-linked polyolefin foam material with a density between 50 and 100 kg/m$^3$. The Shore hardness of the materials for the connecting means is preferably 5 to 50 [Shore A, EN ISO 868:2003], which guarantees an adequate elasticity.

The individual mats may consist homogeneously of a foam material, but they can also consist of various layers of different foam materials and/or of a base of a foam material or various layers of different foam materials and one or two cover layer(s) of compact, but preferably likewise elastic material. Especially preferably, such a cover layer consists of textile-reinforced elastic materials such as rubber, soft PVC or thermoplastic elastomers. Preferably, such cover layer may be laminated to the base foam material thermally or by applying adhesive, e.g. reactive polyurethane adhesive.

Insofar as mats are used which consist of a base of foam material and at least one cover layer, a cover layer can preferably cover the undercut recesses on the top side, which serve for the engagement of the individual connecting means.

The connecting means are then inserted into the recesses from the bottom side of the individual mats in order to join the mats together. The layer covering the top side of the mats can also comprise a layer of foam material.

It is also possible that the undercut recesses, which serve for the engagement of the individual connecting means, do not penetrate the entire height of the foam layer, but only a part of its height. In this embodiment of the invention, the undercut recesses would be covered by foam material of certain height, optionally in addition to a cover layer, e. g of textile-reinforced elastic material. In such embodiment, the height of the individual connecting means is correspondingly less than the height of the mat.

The thickness of the sports mats or the respective layers can be chosen at will within broad ranges, but preferably the thickness of the individual mats is 5 to 100 mm, more preferably 30-60 mm. Insofar as mats consisting of a base and a cover layer are used, the thickness of the cover layer is preferably 0.2 to 5 mm.

Preferably, for the thickness of the sports mat in relation to the radii of the undercut recesses of the respective mats the following relation applies:

$$R < \text{thickness} < 3*R \quad \text{(III)}$$

The individual mats can also have a base of several different foam materials, in order to have an optimal cushioning and absorb the forces of the athletes. The choice of suitable layers is basically familiar to the person skilled in the art.

BRIEF DESCRIPTION OF DRAWINGS

The invention shall be explained more closely below with the aid of a sample embodiment, as well as the drawing. There is shown.

MODES FOR CARRYING OUT THE INVENTION

Figure 1:
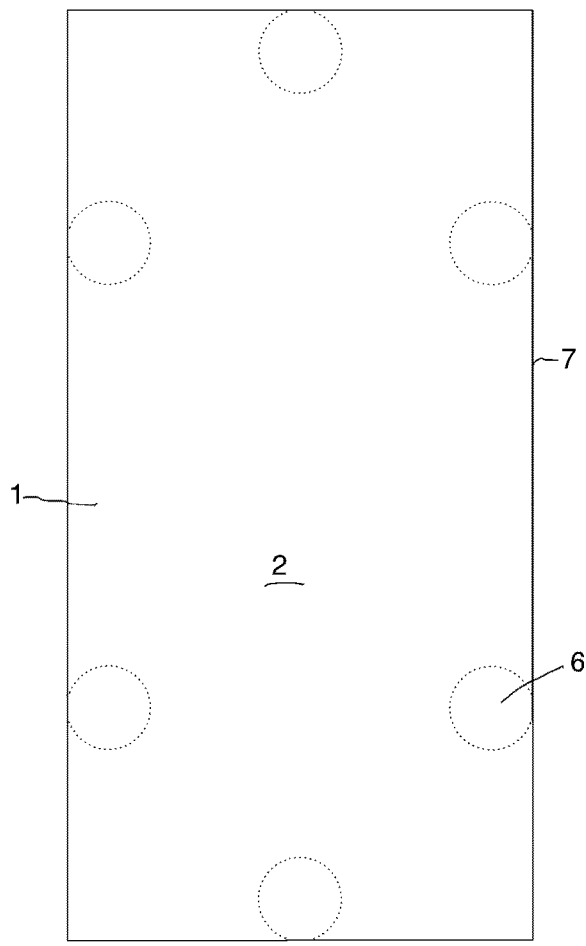
FIG. 1 a sports mat according to the invention in a view of the top side.
Figure 2:
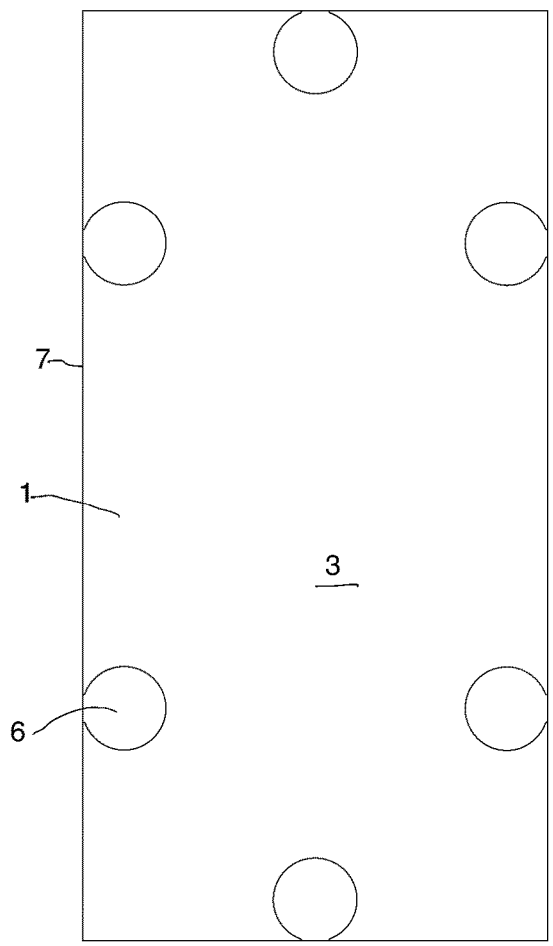
FIG. 2 a sports mat according to the invention in a view of the bottom side.
Figure 3:
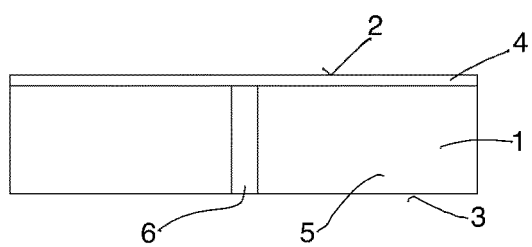
FIG. 3 a sports mat according to FIG. 1 in a side view (as viewed from the narrow side, not true to scale)

FIG. 1 shows a mat 1 according to the invention looking at the top side 2 and FIG. 2 shows the bottom side 3. The mat is composed of two layers with a cushion layer 5 of chemically cross-linked polyethylene of bulk density of 60 kg/m$^3$ with a thickness of 45 mm and a cover layer of fabric-reinforced thermoplastic elastomer (TPE) having a thickness of 1 mm. The cover layer 4 is thermally laminated with the cushion layer 5. The dimensions of the mats are 0.75 m*1.5 m.

As is especially visible in FIG. 1, the cover layer 4 entirely covers all undercut recesses 6, so that they are not visible from the top side 2. The recesses 6 penetrate the cushion layer entirely in the example depicted and have a substantially circular segment shape in cross section. The recesses 6 each have a circular segment region with a radius of 35 mm.

Figure 4:
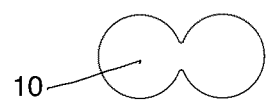
FIG. 4 a view of the connecting means, as used in the sample embodiment per FIGS. 1, 2 and 3.
Figure 7:
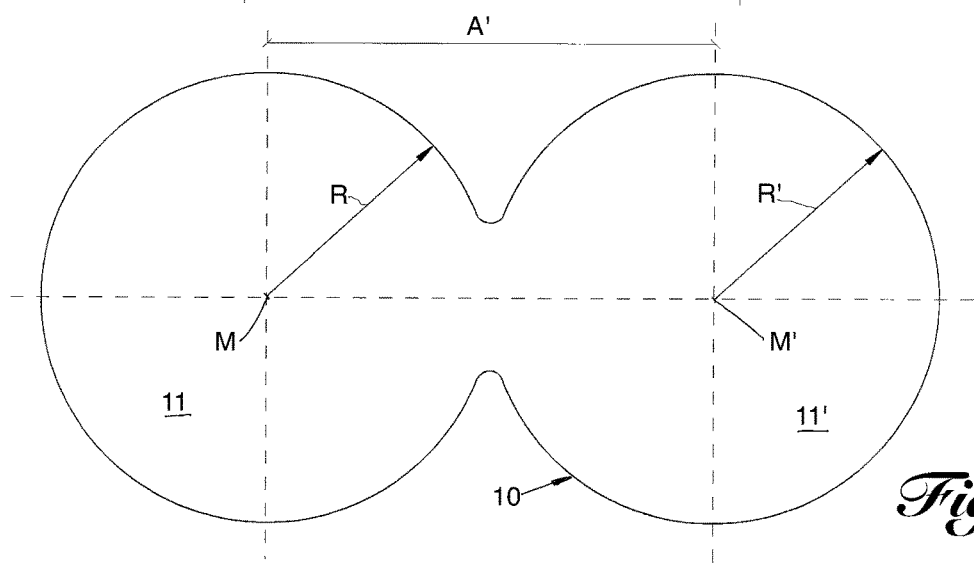

FIGS. 4 and 7 show the connecting means 10 consisting of two circular segment halves joined together by a short joining bridge (circular segment regions 11, 11' in FIG. 7), wherein the two halves correspond exactly to the recesses 6 of the mats 1. The connecting means consist of chemically cross-linked polyethylene with a bulk density of 60 kg/m$^3$, having a thickness of 45 mm.

Figure 5:
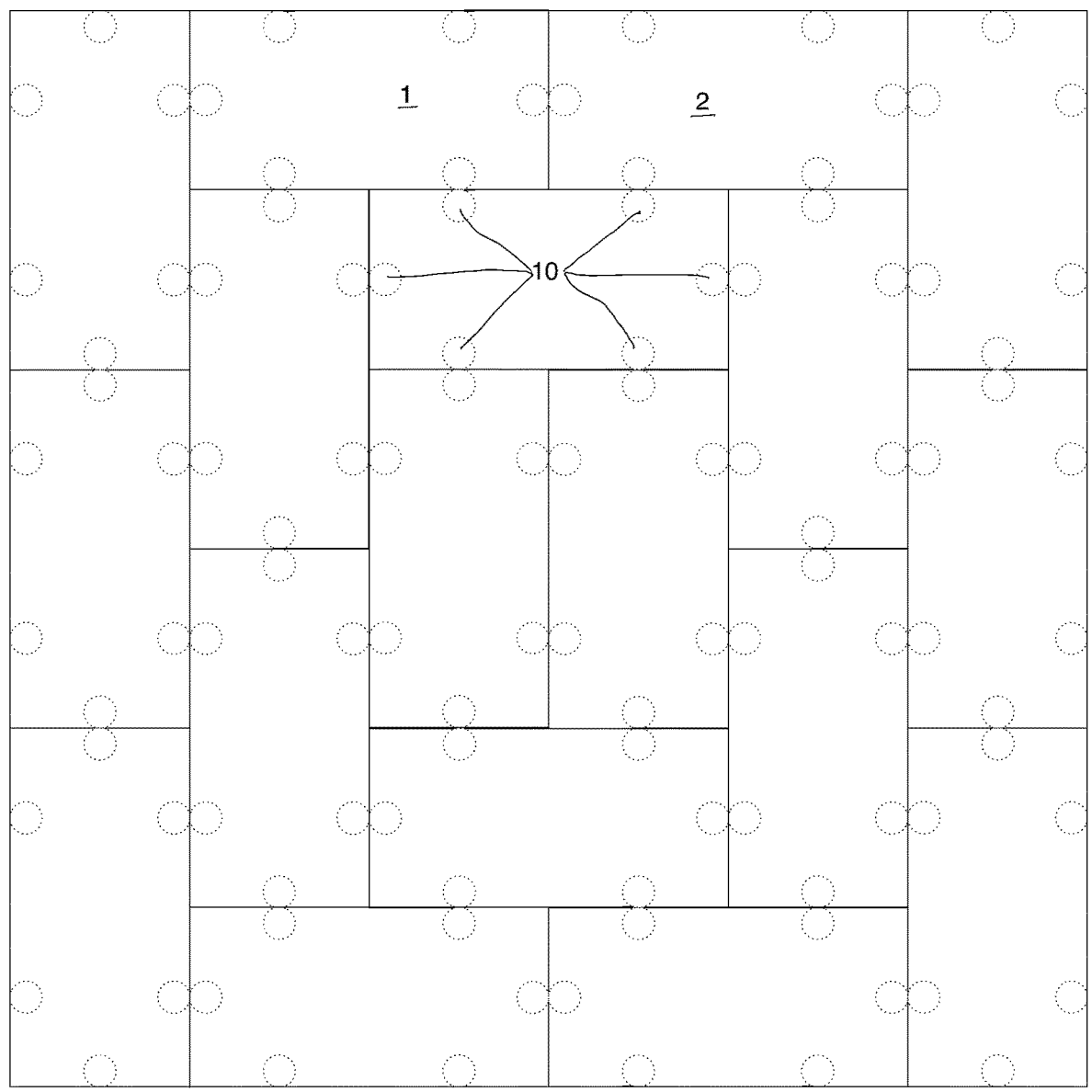
FIG. 5 a mat field constructed with the sports mats of FIG. 1 and the connecting means of FIG. 4 seen from the top side.

FIG. 5 shows a mat field of 18 individual mats 1, being joined together by a total of 42 connecting means 10. At the top side shown in FIG. 5, the connecting means 10 are covered by the cover layer 4 and therefore are not visible.

FIG. 7 shows in enlarged view the connecting means 10 represented and used in FIGS. 4 and 5. The connecting means 10 consists of two substantially circular segments with identical radii R, R', whose spacing A' corresponds exactly to 2*R or R+R'. The two circular segments are joined together by a short joining bridge.

Figure 6:
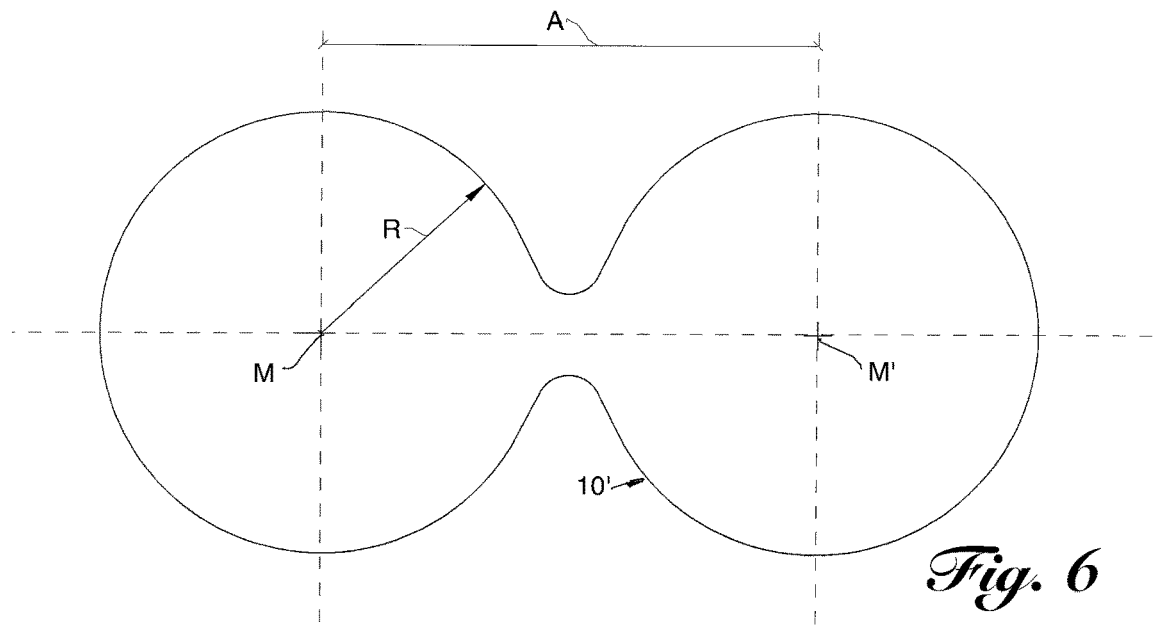
FIG. 6-8 three different embodiment types of the connecting means, each seen from above.

FIG. 6 shows an alternative embodiment of the connecting means 10': this likewise consists of two identical circular segments, each with a radius R, which are joined together by a somewhat longer joining bridge. The spacing A of the two centre points of the two circular segments in this sample embodiment is 1.1*R.

Figure 8:
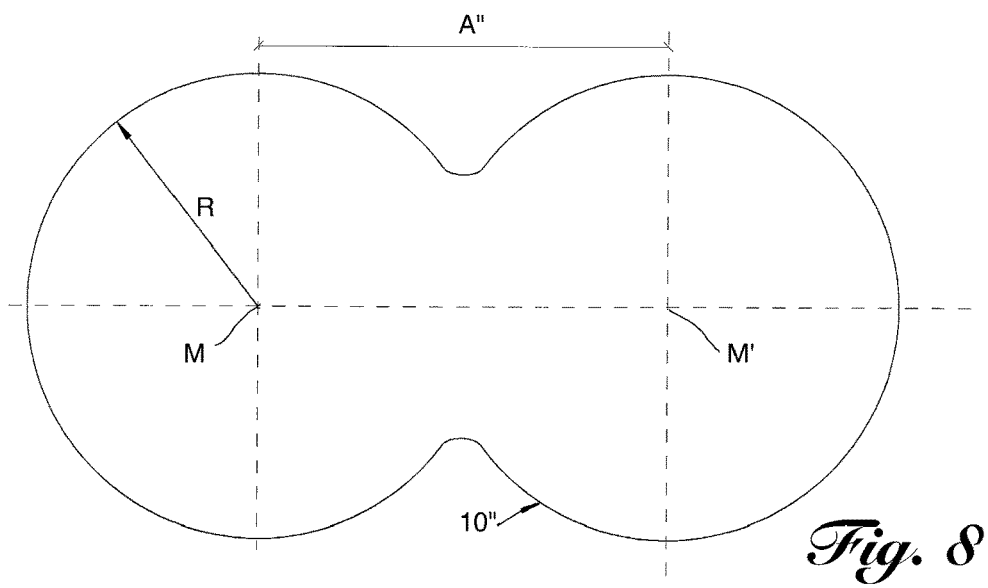

FIG. 8 shows another alternative sample embodiment of the connecting means 10", likewise consisting of two circular segments with identical radius R. In this sample embodiment, the spacing A″ of the centre points M, M′ of the two circular segments is 0.9 R.

In all examples, the radii R and R′ are 35 mm.

Figure 9:
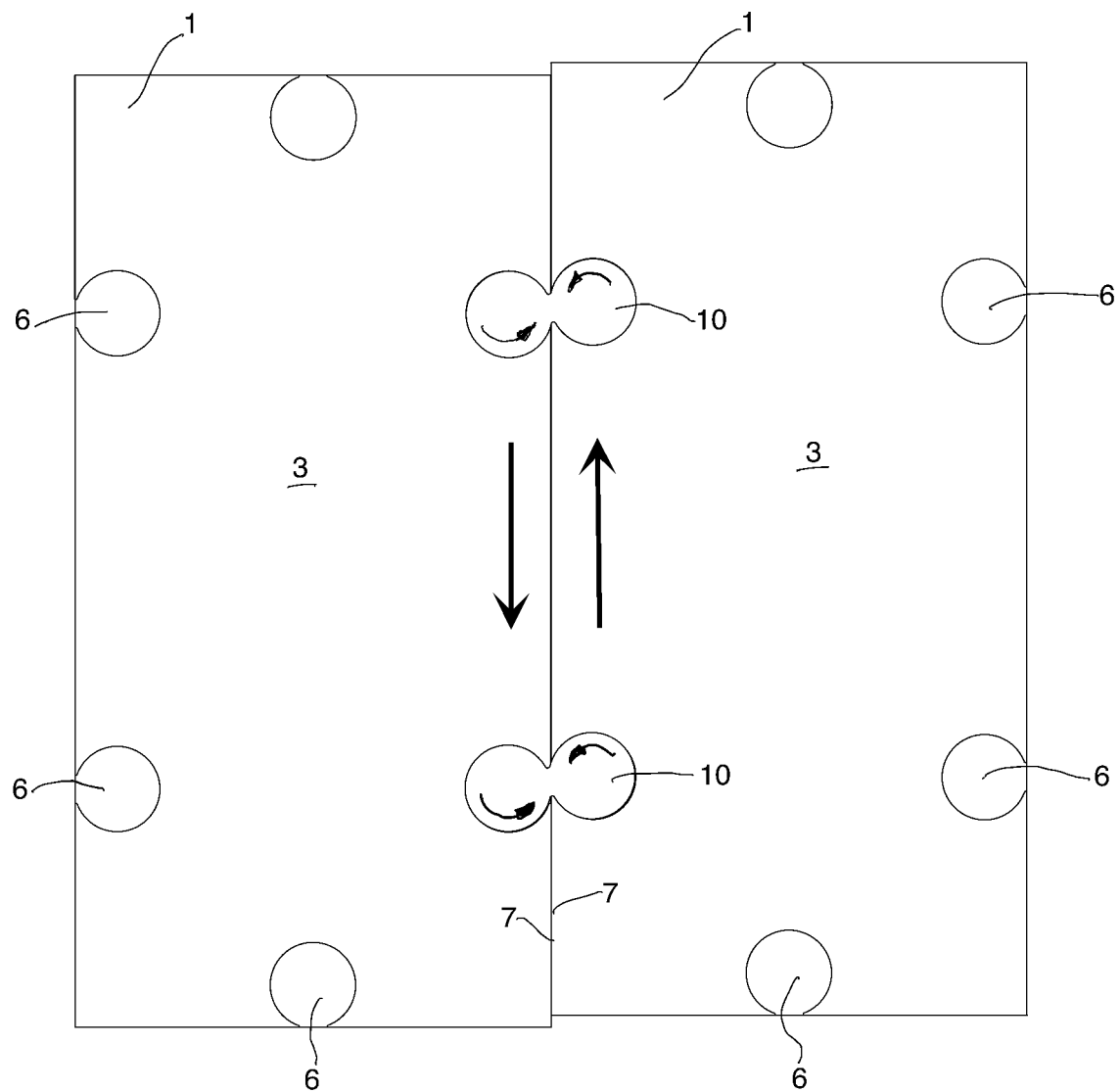
FIG. 9 two interconnected sports mats, to explain the equalizing of tolerances.

The functional principle of the present invention is explained more closely by means of FIG. 9: the two mats 1 are shown in FIG. 9 from the bottom side and are joined together by two connecting means 10 per FIG. 7. The two mats are displaced somewhat relative to one another, as symbolized by means of the two arrows in the centre of FIG. 7. In accordance with this displacement of the mats relative to each other, the circular segment regions 11, 11′ of the connecting means 10 can rotate slightly in the respective recesses 6 of the two mats 1 and additionally deform on account of their elasticity, in order to thereby equal out the necessary tolerances. In this process, the edges 7 of the two mats 1 abutting each other are likewise slightly deformed in the region of the recesses 6 or the two connecting means 10, which is readily possible because of the elasticity of the materials used. Such a displacement of the two mats 1 relative to each other is made considerably easier by the rotation of the respective circular segment regions 11, 11′ of the two connecting means in the recesses 6.

Figure 10:
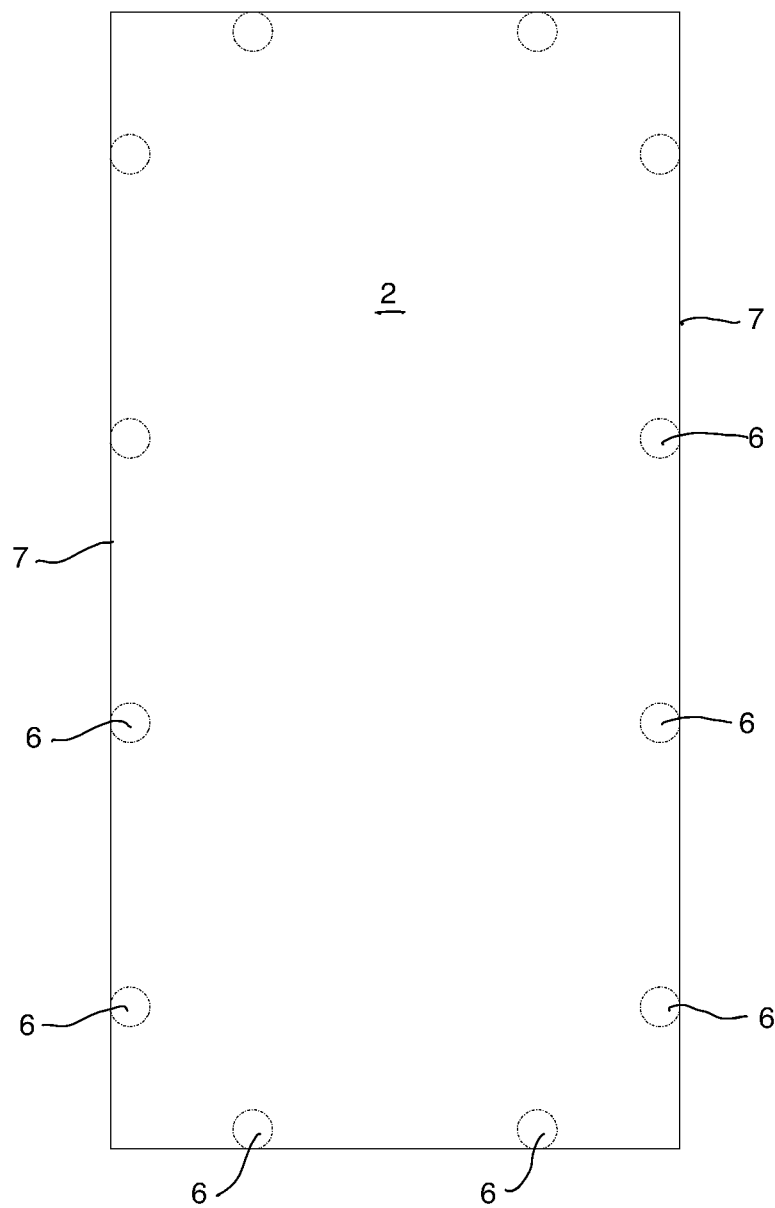
FIG. 10 a further sports mat according to the invention in a view from above.

FIG. 10 shows a slightly modified example of a mat V. This mat 1′ is composed of two layers with a cushion layer 5 of chemically cross-linked polyethylene of bulk density of 70 kg/m$^3$ with a thickness of 49 mm and a cover layer of fabric-reinforced PVC-p having a thickness of 1 mm. The dimensions of the mats are 1 m*2 m, the recesses each having a circular segment region with a diameter of 70 mm.

Figure 11:
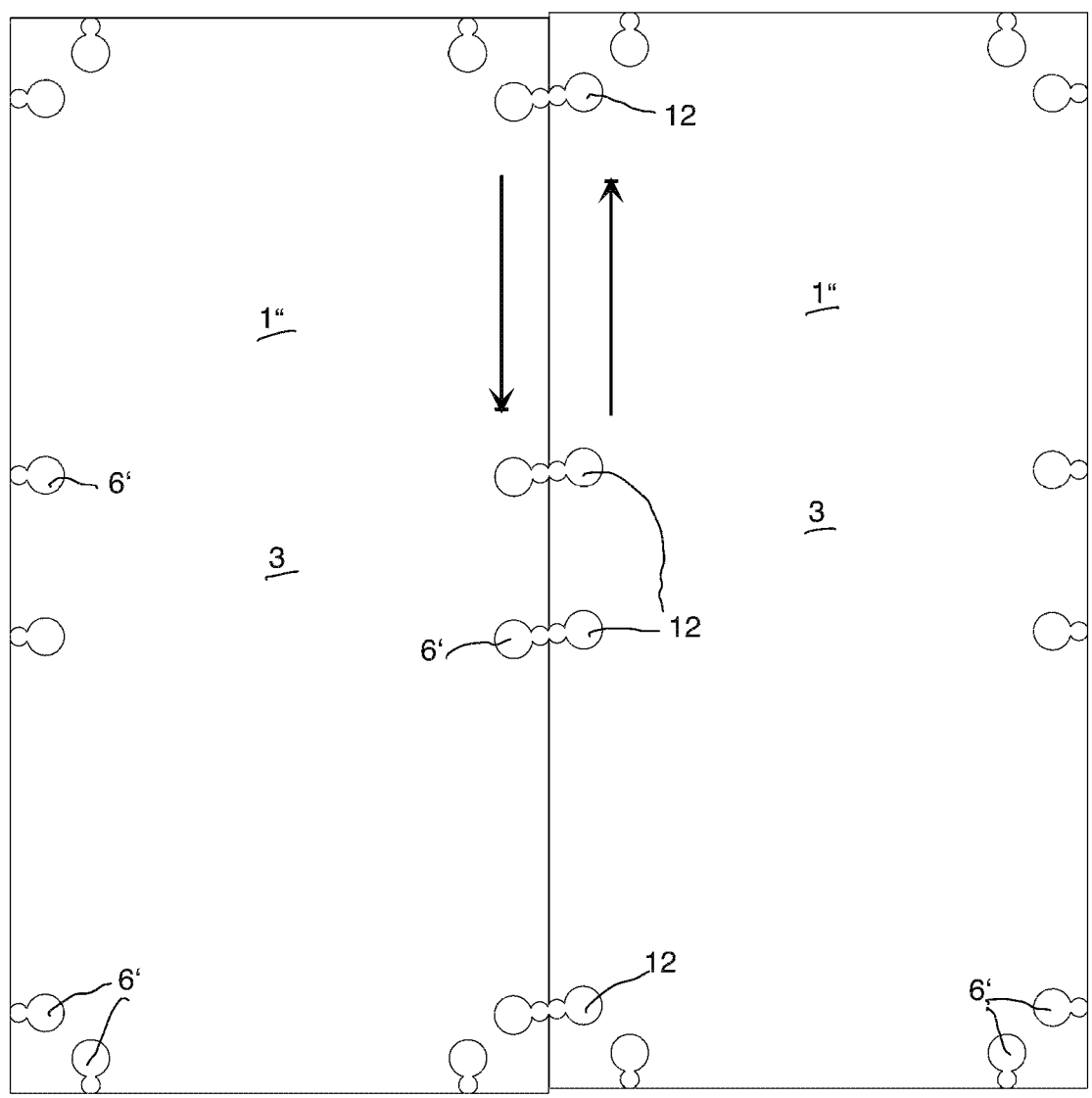
FIG. 11 two connected together sports mats according to an alternative embodiment of the invention in a view from below.
Figure 12:
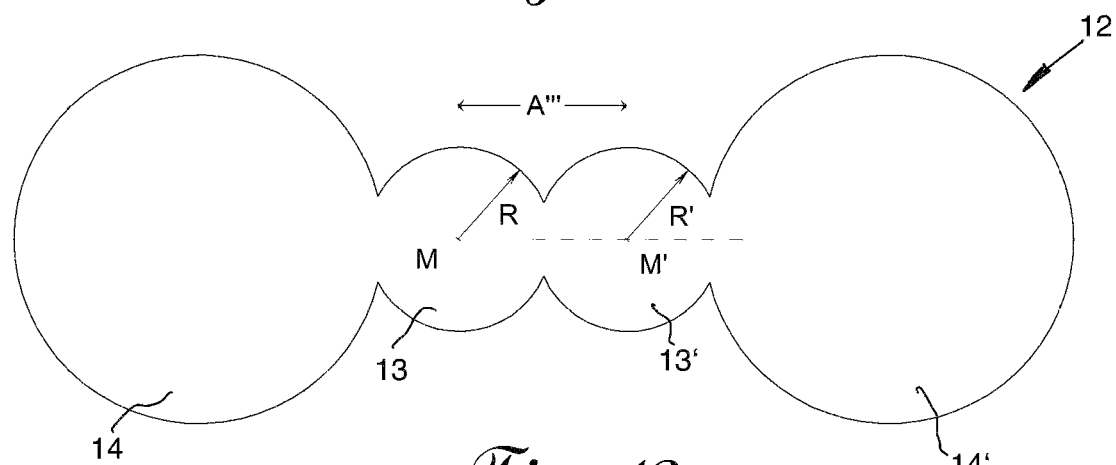
FIG. 12 the connecting means according to FIG. 11 in an enlarged form in a view from above.

FIGS. 11 and 12 show an alternative embodiment of the invention. The two mats 1″ according to this sample embodiment of the invention are composed of two layers with a cushion layer of chemically cross-linked polyethylene of bulk density of 60 kg/m$^3$ with a thickness of 45 mm and a cover layer of fabric-reinforced thermoplastic elastomer (TPE) having a thickness of 1 mm. The cover layer is thermally laminated with the cushion layer. The dimensions of the mats 1″ are each 1 m*2 m. On its longer sides, the mat 1″ has in each case four recesses 6′ and on the two narrow sides in each case two recesses C. In the sample embodiment shown in FIG. 11, the spacing of the recesses 6′ with respect to the edge is in each case 150 mm, the spacing of the two recesses 6′ on the narrow sides is in each case 700 mm, the spacing of the two recesses 6′ in the middle of the two longer sides is in each case 300 mm and the spacing of the two outer recesses 6′ on the longer sides is again 700 mm.

In FIG. 12, the connecting means 12 used in the sample embodiment according to FIG. 11 is shown on a larger scale. The connecting means 12 in this case comprises first of all the two slightly overlapping smaller circular segments, the primary circular segments 13, 13′, and the two outer, larger circular segments 14, 14′, which in turn overlap slightly with the two primary circular segments 13, 13′. In the sample embodiment illustrated, the two radii R, R′ of the primary circular segments 13, 13′ are each 17.5 mm, the radii of the two larger outer (secondary) circular segments 14, 14′ are each 35 mm. The spacing A‴ of the centre points M, M′ of the two primary circular segments 13, 13′ is 32 mm.

The functional principle of this alternative embodiment of the invention is explained more closely by means of FIG. 11: the two mats 1″ are illustrated from the underside in FIG. 11 and joined together via two connecting means 12 according to FIG. 12. The two mats are displaced somewhat relative to one another, as symbolized by means of the two arrows in the centre of FIG. 11. In the case of a displacement of the mats relative to each other, the two primary circular segment regions 13, 13′ of the connecting means 12 can deform, on account of their elasticity, into the respective recesses 6′ of the two mats 1″ with a certain torsional movement and possibly rotate slightly in the adjacent subregions, in order in this way to compensate the necessary tolerances. In this case, the abutting edges of the two mats 1″ are likewise deformed slightly in the region of the recesses 6′ or of the four connecting means 12, this being readily possible on account of the elasticity of the materials used.

LEGEND 1, 1′, 1″ Mat
2 Top side
3 Bottom side
4 Cover layer
5 Cushion layer
6, 6′ Recess
7 Edge
8, 9 not used
10, 10′, 10″ Connecting means
11, 11′ Circular segment regions
12 Connecting means
13, 13′ Primary circular segment regions
14, 14′ Secondary circular segment regions
R, R′ Radius
A, A′, A″, A‴ Spacing
M, M′ Centre point

The invention claimed is:

1. A mat system for sports purposes, comprising:
a plurality of individual mats each with a top side, a bottom side running parallel to said top side, and at least one rectilinear side edge, the rectilinear side edges of the individual mats each having at least one undercut recess, and
at least one connecting means having a shape enabling, by engagement of each one of their halves in respective undercut recesses, a connecting of two mats along their rectilinear side edges, wherein
the individual mats and the connecting means each comprise at least one layer of foam material,
the connecting means each comprise two interconnected primary circular segment regions having radii and centre points,
the connecting means further comprise secondary segment regions that are circular segments, and
for spacing of the centre points of the primary circular segment regions, the following relation applies:

$$0.8 \times (R+R') < A < 1.3 \times (R+R'), \quad (I)$$

R and R′ are the radii of the primary circular segment regions, and
A is the spacing of the centre points of the primary circular segment regions.

2. The mat system according to claim 1, wherein
each of the two primary circular segment regions engages in a rotatable manner within the correspondingly shaped undercut recesses of the individual mats.

3. The mat system according to claim 2, wherein
when two mats lying next to one another at the edges are displaced, the respective primary circular segment regions of the connecting means can rotate within the likewise circular segment undercut recesses and thus equal out considerable tolerances.

4. The mat system according to claim 1, wherein for the spacing of the centre points of the primary circular segment regions the following relation applies:

$$0.9 \times (R+R') < A < 1.15 \times (R+R'). \tag{II}$$

5. The mat system according to claim 1, wherein the connecting means are fashioned in mirror symmetry with the same radii of the primary circular segment regions.

6. The mat system according to claim 1, wherein the secondary segment regions are located on two sides opposite a joining bridge between the two primary circular segment regions of the connecting means.

7. The mat system according to claim 1, wherein the secondary circular segment regions have a larger radius than the primary circular segment regions.

8. The mat system according to claim 1, wherein the individual mats have a rectangular cross section and have an undercut recess on each of their edges every 100-1000 mm of edge length.

9. The mat system according to claim 1, wherein the undercut recesses, which serve for the engagement of the individual connecting means, do not penetrate the entire height of the foam layer, but only a part of its height.

10. The mat system according to claim 1, wherein the individual mats comprise several layers of foam material of different densities.

11. The mat system according to claim 1, wherein the individual mats have at least one layer of foam material containing cross-linked polyethylene.

12. The mat system according to claim 1, wherein the undercut recesses of the individual mats on the top side of the mats are covered by a cover layer, so that the undercut recesses are not visible when looking down on the top side.

13. The mat system according to claim 1, consisting of several of the individual mats connected to each other by a plurality of the connecting means.

14. The mat system according to claim 1, wherein the connecting means have at least one layer of foam material containing cross-linked polyethylene.

* * * * *